United States Patent
Hanslik et al.

[11] 3,766,797
[45] Oct. 23, 1973

[54] POWER DISTRIBUTING TRANSMISSION SYSTEMS

[75] Inventors: Wilhelm Hanslik; Heinz Ratheiser; Friedrich Burger, all of Wien, Austria

[73] Assignee: Krauss-Maffei Aktiengesellschaft, Munchen, Germany

[22] Filed: May 15, 1972

[21] Appl. No.: 253,162

[52] U.S. Cl. .................................................. 74/410
[51] Int. Cl. ............................................ F16h 57/00
[58] Field of Search ........................... 74/410, 665 G

[56] References Cited
UNITED STATES PATENTS

| | | | |
|---|---|---|---|
| 2,466,888 | 4/1949 | Garraway | 74/410 X |
| 3,011,365 | 12/1961 | Stoeckicht | 74/410 X |
| 3,054,496 | 9/1962 | Carter | 198/33 |

*Primary Examiner*—Leonard H. Gerin
*Attorney*—Theodore Hafner

[57] ABSTRACT

The invention relates to a transmission system in which at least one shaft to which power is to be transmitted and at least another shaft parallel thereto are provided each with several gear wheels separately mounted and spaced from each other, the wheels on the different shafts meshing with each other so as to divide the momentum derived from the first shaft substantially equally over each of the meshing pairs of wheels.

21 Claims, 8 Drawing Figures

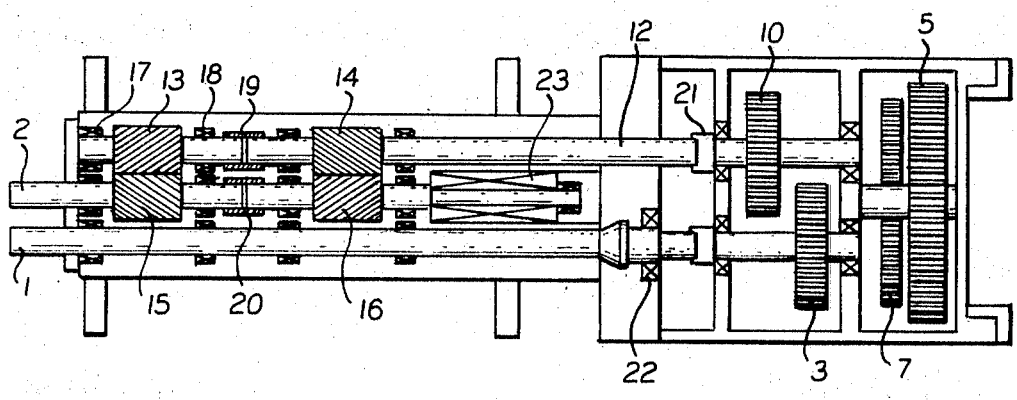
FIG. 1.
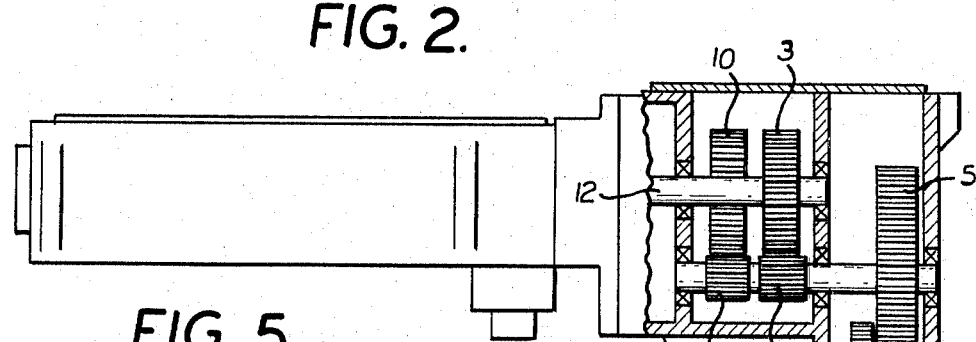
FIG. 2.
FIG. 5.
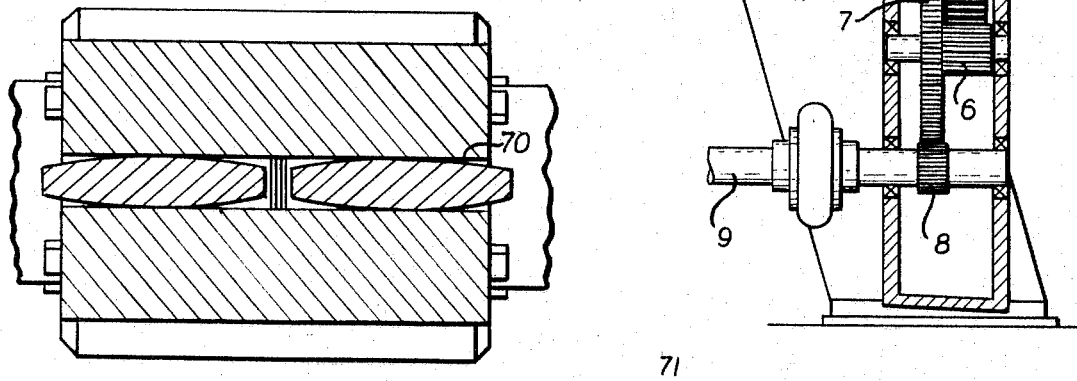
FIG. 6.
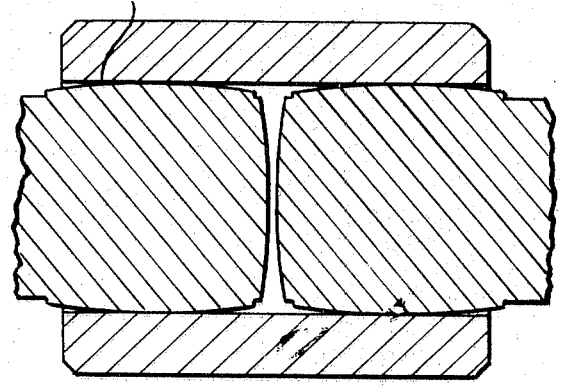

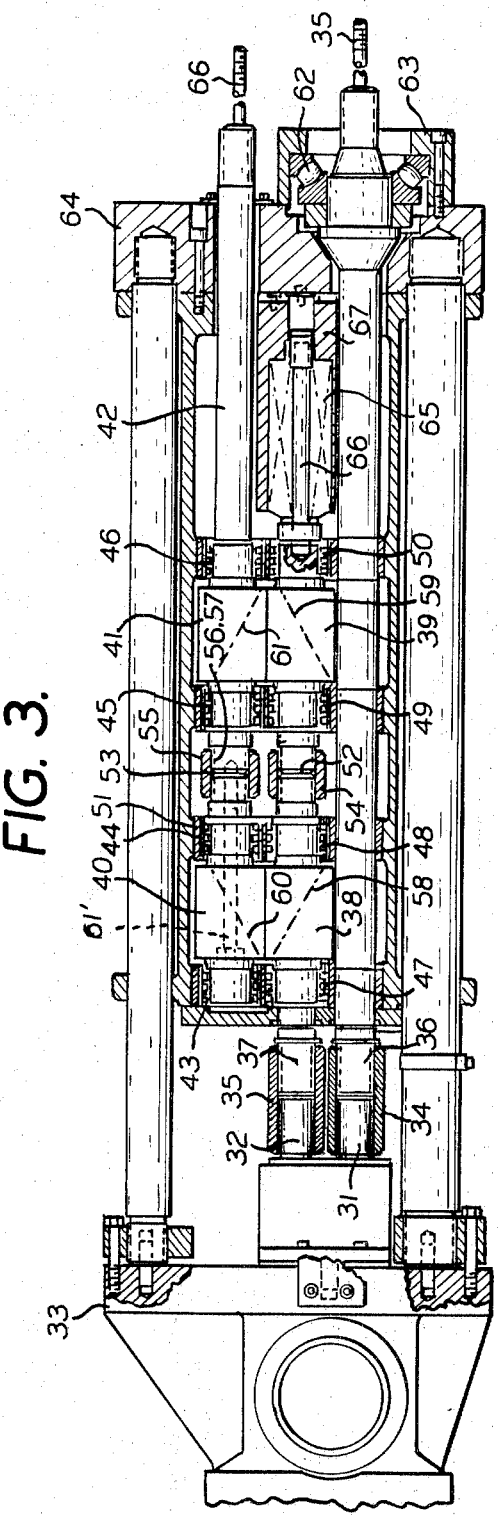
FIG. 3.
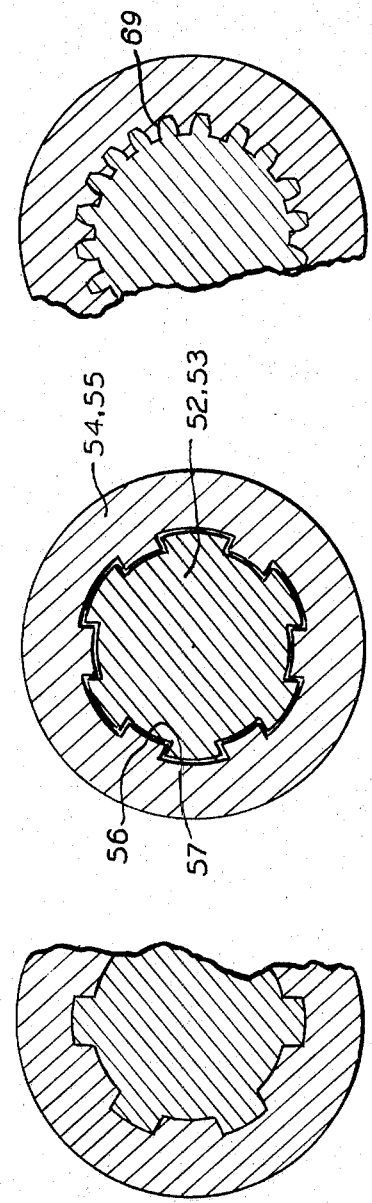
FIG. 4A.
FIG. 4B.
FIG. 4C.

POWER DISTRIBUTING TRANSMISSION SYSTEMS

This invention deals with mechanical power transmission and especially with the distribution of the power derived from a single source through a relatively large number of gear elements over a number of shafts coupled to machine tools such as two or more extruder screws working against each other at relatively low speed.

Until now, the distribution of power over several shafts usually involved the insertion of a minimum number of relatively large gears, primarily for the purpose of reducing costs, such as described, for example, in U.S. Pat. Specification No. 3,359,826. This resulted in local overloads leading to a reduction of gear life and corresponding frequency interruptions of operation. In the case of extrusion, it caused the stopping of rather expensive equipment and often the still stand of an entire production line.

In the development and designing of power distributing transmission gear systems, it has been found that the existing systems were not capable of transmitting rotary momentums of an order of magnitude as required for multiple screw extruders or similar low speed material-handling equipment. At today's rotary speeds, they did not assure an economically acceptable gear life.

While it is known in power distributing transmission systems, to arrange a gear or tooth wheel coaxially with an extruder screw and provide bearings on both sides of the gear mounted on a shaft, and also to use straight or helical teeth, it has been found necessary to apply double helical or herringbone gear with triple bearings. It also required the use of divided bearings. In most instances of this arrangement, slide bearings made of bronze had to be used. At the relatively low speeds under consideration, of the shaft supported on the bearing, it was not possible, with simple injection of the lubricant, to achieve dynamic lubrication so that hydrostatic lubrication had to be applied. Both types of lubrication, however, have the disadvantage that the driving gear wheel is loaded with a higher rotary momentum than the driven system. Thus, only at one determined load and torsion the even bearing of the tooth over the entire tooth flank is assured. This does not meet the requirements of extruder operation.

Equally unsuccessful was the use of a lateral bearing for the driving wheel gear and the increase of distance between the axis of the gears in relation to the distance between the screws, to equalize the twisting of the gears. With a double bearing for the gear, such a construction also does not meet present requirements, nor does it help to add triple bearings and herringbone teeth, which require slide bearings with expensive hydrostatic lubrication.

Since the present market conditions require a duplication and triplication of the output of twinscrew extruders, the economy of the transmission systems available on the market must be seriously questioned.

These disadvantages are eliminated, in accordance with the invention, by subdividing at least the driving wheel, providing double helical tooth configuration, quadruple bearings and preferably also lateral bearings. As a result of this subdivision and with the use of a plug coupling, it is possible to mount on the shafts undivided roller bearings. The individual spur wheels, for example, twice driving and twice driven, will exhibit substantially the same torsion angle at different loads. With such a system, very high rotary momentums can be transmitted, even at elevated speeds of rotation and without limiting the life span of the system.

One of the objects of the invention, therefore, is to divide the power and especially the corresponding rotary momentum evenly and adequately over a relatively large number of intervening gears, so as to reduce local overloads to a minimum compatible with long life under reasonable maintenance conditions, even at the relatively rough and varying operational conditions such as experienced in multi-screw plastic extrusion.

It is a specific object of the invention to eliminate the weak point common to practically all twinscrew extruders, which was found in the mechanical drive of the intertwining screws. This required an analysis of the order of magnitude of the necessary rotary momentum of the screws; to find for such momentum magnitude a driving system of sufficient transmission safety; and to realize such a driving system in the form of an engineering - and production-wise practically acceptable solution.

In the work underlying this invention, it was found that the rotary momentum of each screw of a twinscrew extruder, of 120 mm. diameter, amounts to at least 1,000 mkp for which the transmission system has to be dimensioned.

Furthermore, a driving system of sufficient transmission safety, from a gear-technical point of view, should have the following characteristics:

The safety factor against endurance break must be at least 1.8.

The safety factor against groove formation must be at least 1.3.

The safety factor against tooth shock break must be at least 6.

The ratio of tooth width to pitch circle diameter should not exceed the order of magnitude of 1.5.

More particularly, and especially in the case of the twin screw extruder where the distance of screw axes is fixed, and if the ratio of the gears driving the extruder screws is 1; the pitch circle diameter as well as the admissible tooth width is determined in accordance with the safety conditions established above.

In turn, pitch circle diameter and tooth width will determine — subject to optimal selection of work material, heat treatment and tooth technique — the transmissible rotary momentum. In case now, that the rotary momentum thus calculated, should prove insufficient, then in accordance with the invention, the principle of the division of power is applied, i.e., by means of providing an additional parallel gear pair, the rotary momentum to be transmitted, is divided.

As a further object of the invention, and in accordance with the principle of power division characteristic of the invention, in case of two gear pairs, each pair must transmit half of the rotary momentum as exactly as possible; and the interlocking tooth flanks must come to bear equally over the entire tooth width.

In order to assure a division of the rotary momentum as exact as possible, in accordance with another feature of the invention, and in the case of two gear pairs, the two gears mounted on each shaft, are provided with helical teeth of opposite sense, i.e., in a mirror-symmetrical arrangement with respect to each other.

For similar considerations, in accordance with a further feature of the invention, at least one shaft should be axially free.

This especially applies to the case in which, in addition to the two shafts driving the screws of twin extruder, in accordance with he invention, a third parallel shaft is provided, one of the two shafts driving one of the screws directly, while the other shaft driving the other screw, is being driven through the third shaft and several gears mounted thereon and meshing with corresponding gears of the other shaft in accordance with the division principle underlying this invention.

In this specific case, preferably, the two shafts driving the extruder screws directly, are subject to the back pressure caused by the axial forces resulting from tool resistance, and provided with back pressure relief bearings.

This is in contrast to the arrangement of only two shafts, where at least one of these back pressure relief bearings would have to be arranged movable, which may be complex, and therefore, preferably avoidable.

In accordance with a further embodiment of the invention, and in the case of a third shaft being inserted for transmitting the power in parallel to a shaft directly coupled to an extruder screw to a second shaft also coupled to an extruder screw, this third, and parallel shaft, is provided with a full degree of axial freedom, causing an exact division of the rotary momentum in such a manner that, under control of the rotary momentum derived from this free-wheeling shaft, one of the two gears supported thereon, is being displaced axially until the other one of the two gears bears against the counter flank of the gear meshing therewith and supported on the corresponding shaft driving an extruder screw. In this way, the total rotary momentum is practically exactly divided between the two gear pairs provided in accordance with the invention, with the forces of action and reaction exhibiting equal magnitudes.

In view of the relatively limited width of the individual gears of the multiple gear arrangement according to the invention, as an other feature of the invention, it becomes feasible, manufacturing-wise to assure an exact bearing of the tooth flanks over their entire width.

Still another feature of the invention, is the provision of a releasable coupling between the several gear pairs mounted on each shaft to permit separation of the shafts and mounting, in an arrangement of two gear pairs, each of the four gears involved, separately on two bearings located next to each gear, resulting in a statically justified bearing arrangement of a load on two supports.

In a specific form of this embodiment, the shaft ends supporting the coupling are provided on their outside with a number of wedge-type profiles adapted to receive corresponding counter profiles provided on the inside of the sleeves forming the coupling, in such an arrangement that the shaft connections are rigidly fixed against rotation in peripheral direction and without any play, while a corresponding convex-type of configuration of the tooth flanks provides a hinge-type coupling connection in axial direction.

These and other objects of the invention will be more fully apparent from the drawings annexed herein, in which FIG. 1 represents schematically a power transmission system for a twin-screw extruder, embodying certain principles of the invention. FIG. 2 represents a corresponding side view. FIGS. 3 and 4a illustrate such a system in greater detail, in top and side views, respectively, and partly in section. FIGS. 4b and 4c represent modifications of FIG. 4a, 4c being a preferred one and FIGS. 5 and 6 representing cross sectional views of FIG. 4c in radial and peripheral directions, respectively.

In FIGS. 1 and 2, two shafts, 1, 2, are shown arranged side by side to drive extruder screws (not shown), shaft 1 being driven directly from spur gear 3, which in turn is connected through gears 4, 5, 6, 7 and 8 to a motor driven shaft 9. Another spur gear 10, driven through gear 11 which is coaxial with gear 4, is also connected, on the one side, over gears 5 to 8 to motor driven shaft 9. On the other side, spur gear 10 drives a third shaft 12 mounted parallel to shafts 1 and 2, which are coupled to the extruder screws.

In accordance with the invention, shaft 12 drives shaft 2 through two pairs of power dividing gears, 13, 14 and 15, 16, respectively, provided with helical teeth winding in opposite directions. Each of the gears 13 to 16 is provided with a pair of separate bearings, such as indicated for gear 13, at 17, 18. Shafts 2 and 12 are separable by coupling sleeves 19, 20, which permit the mounting of undivided bearings especially of the roller type.

While shaft 12 is arranged axially movable in a sleeve schematically indicated at 21, in accordance with the invention, shafts 1 and 2, which are directly coupled to the extruder screws, are arranged axially fixed, supported on back pressure bearings schematically indicated in FIG. 1 at 22 and 23 respectively.

In a more detailed embodiment of the invention, such as illustrated in FIGS. 3 and 4, the shafts 31, 32, of the screws (not shown) of a twinscrew extruder, the frame of which is shown in part at 33, are shown to be coupled through couplings 34, 35 to the shafts 36, 37 of a power distributing transmission system in accordance with certain aspects of the invention.

Shaft 31 is connected to a power source such as an electric motor through a speed reducing gear mechanism not shown but of the type indicated in FIGS. 1 and 2, at 3 through 9. Shaft 32 is connected to the same speed reducing gear mechanism through two or more power dividing gears, 38 and 39, mounted on shaft 37 and meshing with gears 40 and 41 mounted on shaft 42, which in turn is connected to the motor controlled speed reducing gear mechanism such as shown in FIGS. 1 and 2, at 10, 11, 5 to 9. The invention, of course, is not limited to the particular tyep of speed reducing mechanism described or illustrated.

Each of gears 38, 39, 40 and 41 is arranged between separate roller bearings illustrated in FIG. 3 at 43 through 50 mounted on each side of gears 38, 39 and 40, 41, respectively, which in accordance with the invention can be made undivided in solid supporting rings as indicated, for example, in FIG. 3 at 51.

The mounting of bearings 43 to 50 is effected by separating shafts 37 and 42 at 52, 53, and connecting the resulting shaft ends through coupling sleeves 54, 55, which are axially slidable over the corresponding shaft ends and radially fixed, through key shaped configurations, in which longitudinal projections 56, along the inner periphery of sleeves 54 and 55 will fit into corresponding key-ways or grooves 57 arranged along the outside of shafts ends 52, 53, respectively, as apparent from the cross section shown in FIG. 4a.

As further illustrated in FIG. 3, adjacent gears such as 38, 39, and 40, 41, respectively, are provided with helical teeth winding in opposite directions for gears mounted on the same shaft. This is schematically indicated in FIG. 3 by diagonal dotted lines 58, 59 for gears 38, 39, and by dotted lines 60, 61 for gears 40, 41. Helical teeth 60, 61 result in an axial force tending to separate the shafts of gears 40, 41 and which is counteracted by a screw bolt schematically indicated at 61' holding the gear shafts together.

The shafts 36, 37, connected through shafts 31, 32 to the extruder screws, are axially fixed by means of back pressure bearings.

In the embodiment shown in FIG. 3, the back pressure bearings for the different shafts are appropriately different, the relatively long shaft 36 being provided with a conical roller bearing such as illustrated at 62 and supported on a cover plate 63 attached to frame portion 64. The relatively shorter shaft 37 is supported on a tandem bearing schematically indicated in FIG. 3 at 65 and effective on a special back pressure shaft 66 extending from and attached to shaft 35 and supported on receptacle 67.

Shaft 42, which transmits the primary rotary momentum to be divided over the gears of shafts 42 and 37, is axially movable, with no back pressure bearing being attached thereto, this in accordance with the invention permits the driving gears supported thereon to apply the rotary momentum to the driven gears meshing therewith in such a way that under control of the rotary momentum applied to the driving gears one of these driving gears is axially displaced until the next driving gear bears against the counter flank of the driven gear, meshing with the second driving gear.

This flexibility of operation contributes to the equal division of the rotary momentum as well as to a self adjustment of the engaging tooth flanks, which equalizes stress and reduces wear and tear to a minimum.

A further flexibility of operation, in accordance with the invention, is achieved by a specific shaping of the meshing elements, especially those of couplings 54 to 57.

This is illustrated in FIG. 4b, which represents a modification of FIG. 4a, in which the meshing elements consist of tooth flanks of evolvent surface configuration indicated at 69.

In another and preferred modification illustrated in FIG. 4c and in the cross sectional views of FIGS. 5 and 6, the meshing tooth surfaces parallel to the axis are substantially straight and parallel apart from a convex configuration indicated in FIG. 5 at 70 for the tooth flank and in FIG. 6 at 71 for the top face of the tooth.

This modification differs from the dovetail and evolvent configurations of FIGS. 4a and 4b in that it is not only easier to manufacture, but most important, it also permits the meshing elements to act as a double cross hinge through which small angular inclinations and small lateral displacements can be rendered harmless.

While the invention has been described and illustrated by way of certain mechanical elements or parts of such elements, or by certain numbers or arrangements of such elements or such parts, it is not limited thereto, nor is it limited to the specific structure or shape of gears, shafts, bearings, couplings and any other part or portion of the structure, but it may be applied in appropriate manner or form without departing from the scope of this disclosure.

We claim:

1. In a power transmission system, at least one shaft to which power is to be transmitted, and at least another shaft mounted substantially parallel thereto, and means, including at least two gear wheels on each of said shafts, mounted spaced from each other for transmitting power from said other shaft to said first shaft; the gear wheels on the different shafts meshing with each other, and being provided each with separate bearings on each side of each wheel so as to divide the rotary momentum to be transmitted, substantially equally over each of the pairs of meshing gear wheels.

2. System according to claim 1, wherein the relation of tooth width to pitch circle diameter of at least some of said wheels, is of the order of not more than 1.5.

3. System according to claim 1, comprising a coupling between the wheels of at least one shaft, and substantially undivided roller bearings on each side of each of said wheels.

4. System according to claim 1, wherein one of said shafts is axially displaceable, and the other shaft is axially fixed.

5. System according to claim 1, wherein the driving shaft is axially displaceable.

6. System according to claim 1, wherein adjacent wheels mounted on at least one shaft, are provided with helical teeth of opposite senses.

7. System according to claim 1, comprising at least two extruder screws, one coupled to the driven shaft; and a third shaft parallel to the two other shafts and directly connected to said second extruder screw.

8. System according to claim 1, comprising a power source, and a third shaft parallel to said other two shafts; said power source being connected to said third shaft and the driving shaft so as to permit transmission of power simultaneously from said third shaft directly, and from said driving shaft to said gear wheels.

9. System according to claim 1, comprising a power source, and a third shaft parallel to said other two shafts; said power source being connected to said third shaft and said driving shaft so as to permit transmission of power simultaneously, from said shaft directly, and from said driving shaft to said gear wheels; the driven shaft and the third shaft being provided with back pressure bearings, while the driving shaft is axially free.

10. In a power transmission system, at least one shaft onto which power is to be transmitted, and at least another shaft mounted substantially parallel thereto, substantially without any power being transmitted therethrough except to the first shaft; at least two gear wheels on each of said shafts spaced from each other; the gear wheels on the different shafts meshing with each other; and being provided each with substantially undivided roller bearings on each side of the wheel; said first shaft being also provided with a back pressure bearing; and coupling means between two wheels arranged on each shaft to permit the mounting of said roller bearings.

11. In a power transmission system, at least one shaft onto which power is to be transmitted, at least another shaft mounted parallel thereto, substantially without any power being transmitted therethrough except to the first shaft, gear means on each of said shafts meshing with each other, including at least two gear means on at least one of said shafts to permit the rotary momentum to be transmitted, to be divided; said two gear means being mounted spaced from each other and provided with separate bearings on each side thereof; and means between said gear means for decoupling said one shaft so as to mount said gear means and their associated bearings substantially separately.

2. In a power distributing transmission system for multiple screw extruders, means for mounting the screws to rotate against each other at minimum distance, means for driving at least one screw directly, and means for driving another screw including several gears coupled to each other and meshing with corresponding gears driving said other screw ; said gears being coupled through axially movable but radially rigid coupling means.

13. System according to claim 12 in which adjacent gears have oppositely directed helical teeth.

14. System according to claim 12, comprising shafts supporting said several and said corresponding gears, and wherein at least one of said shafts is mounted axially displaceable.

15. System according to claim 12 comprising parallel shafts supporting said several and said corresponding gears, at least the shaft supporting said several gears being axially displaceable while the other shaft is axially fixed.

16. System according to claim 12 comprising shafts supporting said several and said corresponding gears; at least one of said shafts being mounted axially displaceable, the other shaft being axially fixed so that under control of the rotary momentum applied to the first shaft, one of the gears supported on said first shaft, is axially displaced until another one of said gears bears against the counter flank of the corresponding gear meshing with said other gear.

17. System according to claim 12 comprising means supporting said several gears and said corresponding gears separately, at least said several gears being supported axially movable so that under control of the rotary momentum applied to said several gears, at least one of said several gears is axially displaced until another one of several gears bears against the counter flank of the corresponding gear meshing with said other gear.

18. In a power dividing transmission system for multi-screw extruders, means for driving at least one of the screws directly, means for driving at least another screw, cooperating with said first screw, including several coaxial gears meshing with corresponding gears coaxial with said other screw, the several gears being arranged axially movable; and the corresponding gears being arranged axially fixed; thereby dividing the rotary momentum transferred to the other screw equally over the several gears and the corresponding gears, so that under control of said momentum one of said several gears is axially displaced until another one of said several gears bears against the counter flank of the corresponding gear meshing with said other gear.

19. In a power transmission system, at least one working axis onto which power is to be transmitted, and at least another substantially parallel axis which does not transmit power except to said one axis; both said axes having arranged thereon gear means meshing with each other so as to impart to said axes substantially equal but opposite speeds; the gear means on at least one of said axes including at least two tooth wheels spaced from each other and independently mounted so as to divide the power transmitted from one axis to the other equally over each of said tooth wheels.

20. System according to claim 19, comprising shafts for said tooth wheels and means for coupling said shafts, including a sleeve having inner profiles meshing with outer profiles on said shafts; said meshing profiles including surfaces of convex configuration extending substantially in the direction of the shaft axis, thereby permitting, when in operation, while being secured against rotation, hinge-like displacements in axial direction.

21. System according to claim 19, comprising shafts for said tooth wheels and means for coupling said shafts, including tooth-shaped profiles interlocking with each other and having radial as well as peripheral surfaces of convex configuration extending substantially in the direction of the shaft axis, thereby permitting, when in operation, while being secured against rotation, hinge-like displacements in axial direction.

* * * * *